Jan. 5, 1932.  W. A. COLMAN ET AL  1,839,740
CORN PLANTER
Filed Sept. 24, 1930  3 Sheets-Sheet 1
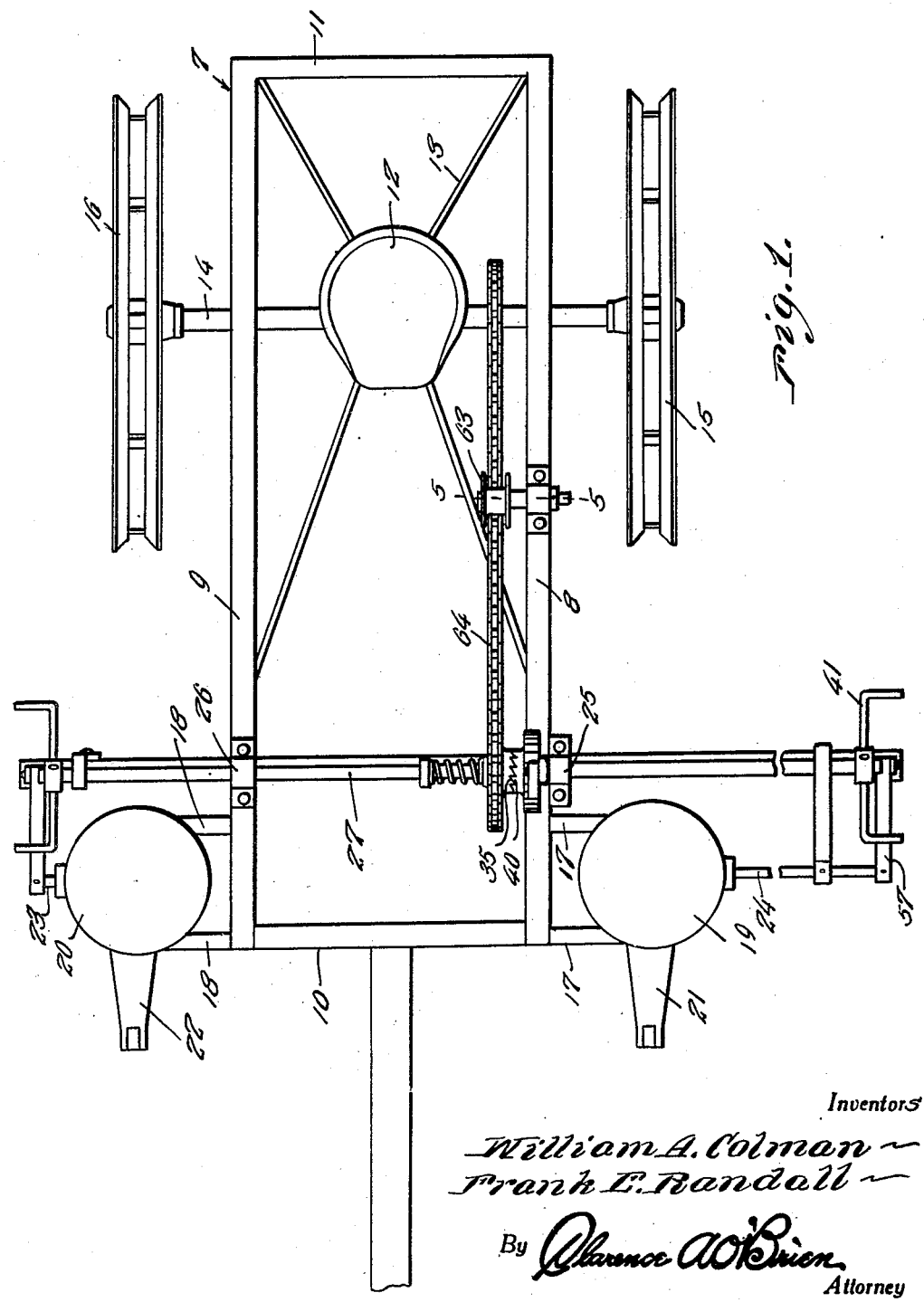
Inventors
William A. Colman
Frank L. Randall
By Clarence A. O'Brien
Attorney

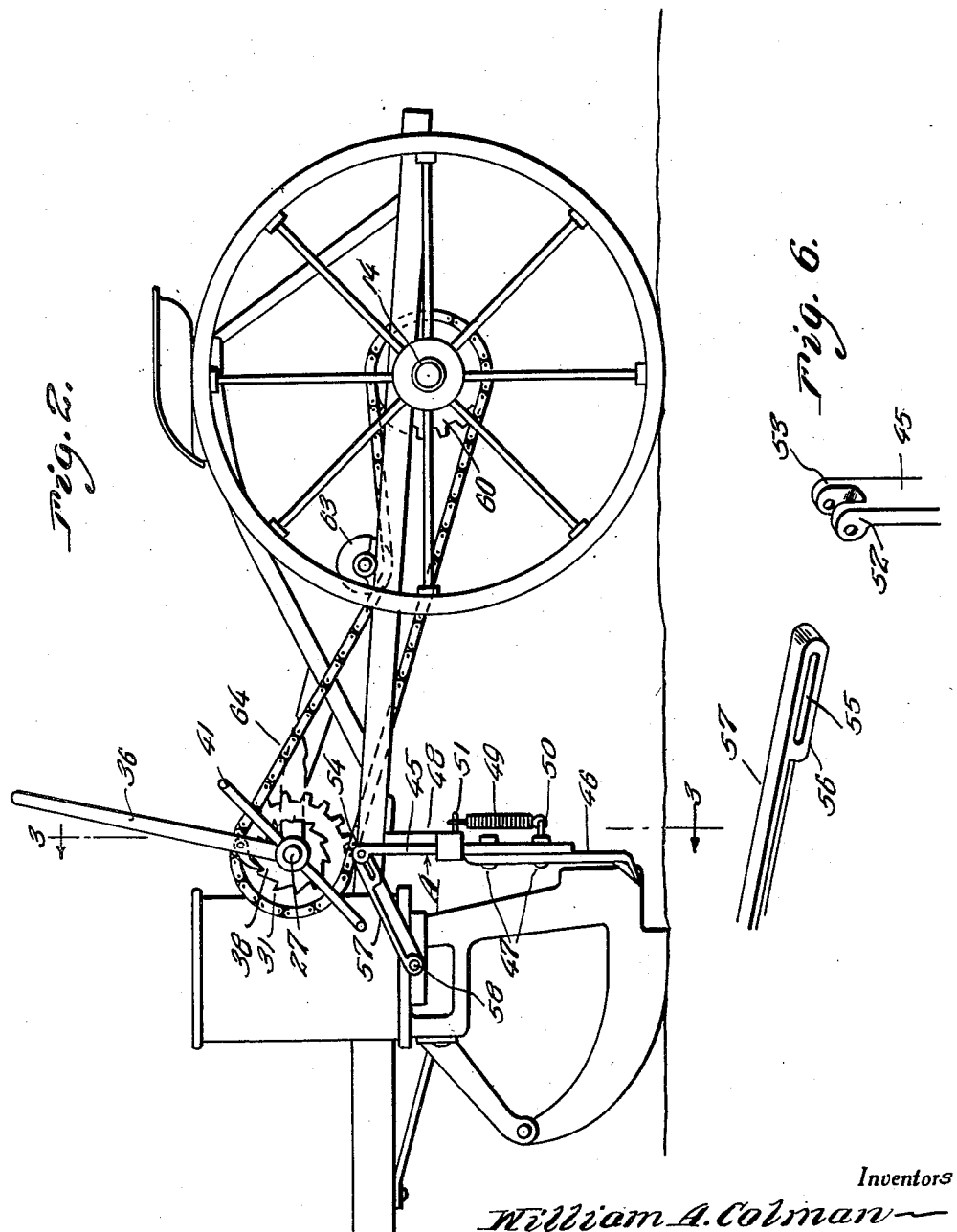

Jan. 5, 1932.  W. A. COLMAN ET AL  1,839,740
CORN PLANTER
Filed Sept. 24, 1930  3 Sheets-Sheet 3
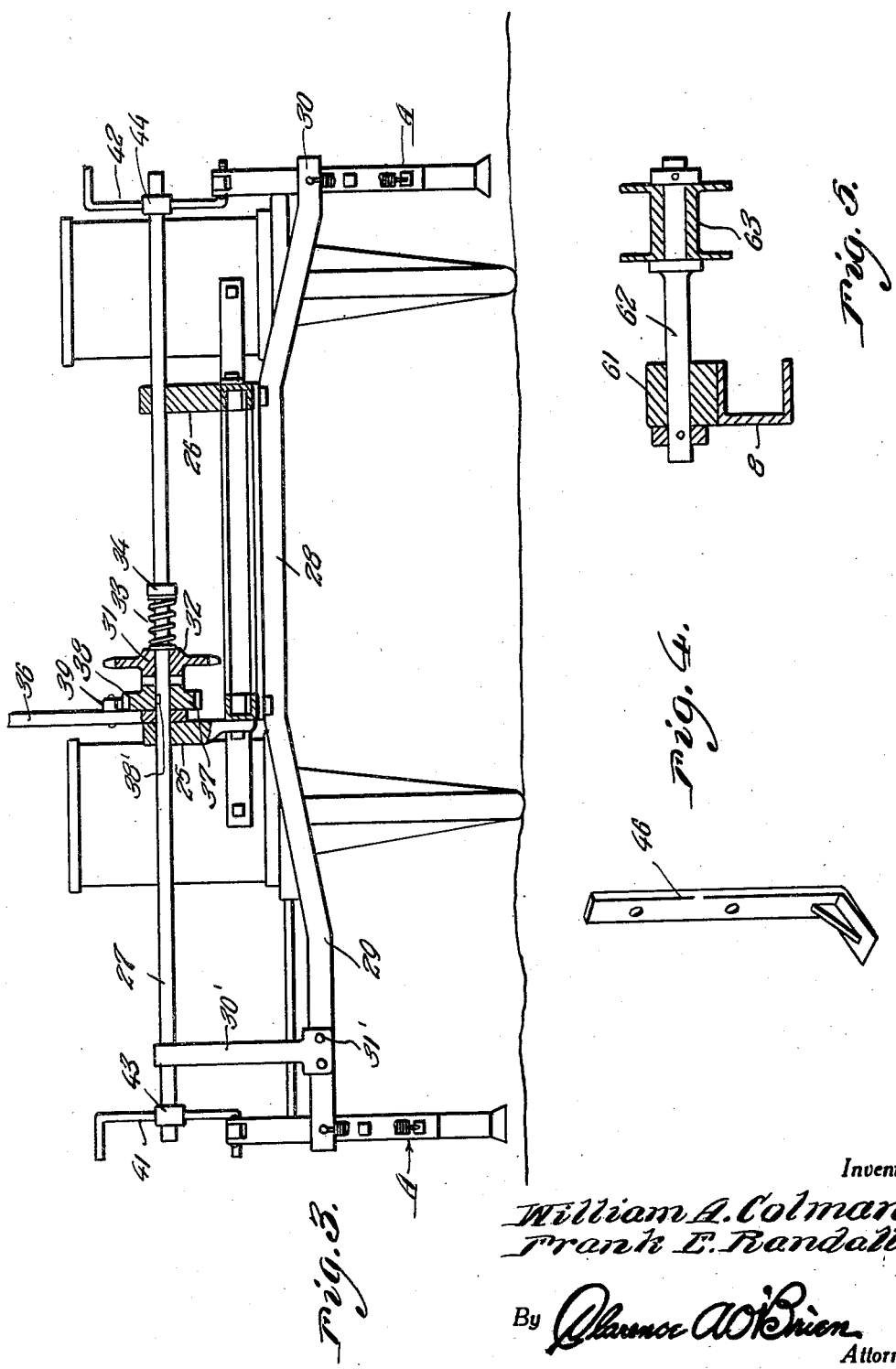
Inventors
*William A. Colman,*
*Frank E. Randall,*
By *Clarence A. O'Brien*
Attorney Patented Jan. 5, 1932

1,839,740

UNITED STATES PATENT OFFICE

WILLIAM A. COLMAN AND FRANK E. RANDALL, OF XENIA, ILLINOIS

CORN PLANTER

Application filed September 24, 1930. Serial No. 484,194.

This invention relates to corn planters, and an object of the invention is to eliminate the old check row wire method of planting corn and provide a tripping mechanism for the valves that deposit corn.

Another feature of the present invention is to provide marks for the next succeeding row of corn that operates in conjunction with the valve tripping mechanism.

A further feature of the present invention is to provide for turning the tripping shaft independently of the guiding mechanism so that the marking and the depositing of the grain may be started on the new row, after the corn planter has been turned around.

Further objects of the invention are to provide a corn planter of the character referred to that is strong, compact and durable, thoroughly reliable for its intended purpose, very simple in its operation and comparatively inexpensive to manufacture.

With the foregoing and other objects in view, the invention consists of a novel construction, combination and arrangement of parts as will be hereinafter more specifically described and illustrated in the accompanying drawings wherein is disclosed an embodiment of the invention, but it is to be understood that changes, variations and modifications that changes may be resorted to without departing from the spirit of the claims hereto appended.

In the drawings wherein like reference characters denote corresponding parts throughout the several views:—

Figure 1 is a top plan view partly broken away of the corn planter in accordance with the present invention.

Fig. 2 is a side elevation thereof.

Fig. 3 is a detailed vertical section taken substantially on the line 3—3 of Fig. 2 and looking in the direction of the arrows.

Fig. 4 is a perspective view of one section of the marker arm,

Fig. 5 is a detailed sectional view taken substantially on the line 5—5 of Fig. 1, and Fig. 6 is a disassembled view of the link and marker arm.

In the drawings wherein for the purpose of illustration is shown the preferred embodiment of the invention, 7 indicates generally the rectangular frame of the corn planter including side rails 8, 9 and end rails 10, 11.

There is a seat 12 supported above the frame 7 on upwardly converging rods 13, the lower ends of which are secured to the frame. Carried by the frame is a rotatable axle 14 on the ends of which are rigidly secured the ground engaging wheels 15, 16 which are adjacent the rear end of the frame.

Carried by lateral extensions 17 and 18 at the forward ends of the frame are a pair of hoppers 19, 20 that carry the corn to be planted. Leading downwardly from the hoppers 19, 20, are the drill boots 21, 22 respectively. A valve operating rod 23 is carried by the hopper 20 and a valve operating rod 24 is carried by the hopper 19 the purpose of which are to permit the depositing of corn at predetermined intervals, depending upon the rotation of the valve rods.

On the side rails 8, 9 are carried upstanding bearing posts 25, 26 through which is journalled the operating shaft 27. Secured to the bottoms of the side rails 8, 9 is a cross arm 28 having extensions 29, 30 thereon that project laterally of the side rails of the frame. Adjacent one end of the extension 29 is an upright bearing standard 30', the lower end of which is anchored to extension 29 by bolts 31'. In the upper end of this standard 30' is journalled the outer end of the drive shaft 27.

Rotatably mounted on an intermediate portion of the drive shaft 27 is a sprocket wheel 31 against one face of the hub 32 of which bears the free end of a coil spring 33 circumposed about the shaft 27. The outer end of the coil spring 33 bears against collar 34 rigidly secured to the shaft, whereby the sprocket wheel 31 is normally urged inwardly. On the other face of the hub 32 there are formed a series of teeth 35 about the periphery thereof. The lower end of a lever 36 is loosely mounted on the drive shaft 27 and held between the inner face of standard 25 and the ratchet wheel 37. The ratchet wheel 37 is keyed rigidly to the shaft 27 and turns therewith. The key is indicated at 38'. The periphery of the ratchet wheel 37 is provided with teeth 38 with which the ratchet pawl 39 that is carried by the lever 36 engages with. The inner face of the hub of the ratchet wheel 38 is formed with teeth 40 which mesh with the teeth 35 on sprocket 31 so that said wheel 38 will turn with the sprocket 31 when said sprocket is turned in a clockwise direction, but allow the ratchet wheel to turn freely in a counter-clockwise movement, which movement allows the shaft 27 to be turned independently of the drive means to be presently described.

On the free end of the drive shaft 27 are the U-shaped tripping arms 41, 42 the centers of which are anchored hubs 43, 44 rigidly secured to the drive shaft. The legs of the tripping arms project outwardly so as to be free to engage with the links to be presently described.

There is a marking member A on each side of the drill laterally of the boot and these marking members are arranged to trip simultaneously with the operation of the valve operating means. Each of the marking members A are formed in two sections 45, 46, bolted together as at 47 intermediate their ends. There is a bracket 48 carried by each side rail in which the upper section 45 is slidable. These markers are vertically disposed for sliding movement. Each marking member A is retractile by reason of a coil spring 49 having the lower end thereof secured to an eye 50 on the lower section 46 and having the upper end thereof secured to an eye 51 on the bracket 48. On the upper end of the upper section 45 are a pair of spaced apertured ears 52, 53 that carries the pin 54 that slides in an elongated slot 55 formed in the head 56 on one end of the link 57. The other end of the link is rigidly anchored to each valve operating rod 23 and 24 as at 58. The links 57 are disposed in the path of the legs of the tripping arms 41, 42, so that when the legs engage the links, the markers A will be forced downwardly to make marks for the next succeeding rows of corn. As soon as the legs of the tripping arms pass free of the links 57 the marking members are retracted free of the ground by the coil springs 49. Secured to the axle 14 is a relatively large sprocket wheel 60 and a chain is trained over the sprocket wheel 60 and the sprocket wheel 31 transmitting power from the axle 14 to the drive shaft 27. On the side rail 9 is anchored a bearing 61 that carries a short spindle 62 on the free end of which rotates a pulley 63 that forms a head rest bearing on one run of the chain 64 for taking up the slack therein. In the application of the invention, it will be understood that the tripping members 41, 42 bear downwardly on the links 57 on each side of the frame, which action causes the marking members A to move downwardly to mark the next succeeding rows of corn, and at the same time also move the valve operating shafts 23, 24. When the legs of the tripping arms pass the links 57, the marking members A rise free of the ground and the depositing valves in the hopper will be closed, in preparation for the next tripping action of the tripping arms.

Now when the machine has reached the end of the rows and the machine is turned around it may be found that the valves are not ready to open where the mark was made at the end of the row. In this event lever 36 is moved in a clockwise direction until the parts are in the proper position. Further movement of the lever 36 will cause the marker arms to lower and seeds to be deposited, whereupon the corn planter is ready to move up the row.

The present embodiment of the invention has been disclosed in considerable detail merely for the purpose of exemplification since in actual practice it attains the features of advantage enumerated as desirable in the statement of the invention and the above description.

It is to be understood that by describing in detail herein any particular form, structure or arrangement, it is not intended to limit the invention beyond the terms of the several claims or the requirements of the prior art.

Having thus described our invention, what we claim as new is:—

1. In a corn planter including a valve operating rod, an arm attached at one end to said rod, a marker connected to the free end of the arm and actuated thereby, a driven shaft and an arm thereon engaging the first mentioned arm during the rotation of the shaft for operating the feeding means and the marker.

2. In a corn planter including its hoppers and the rods for operating the feeding means of the hoppers, an arm attached to each rod and having its free end slotted, a pair of vertically movable markers, a pin at the upper end of each marker engaging the slot in each arm, a spring for normally holding the markers in raised position, a driven shaft, a pair of oppositely arranged arms at each end thereof for engaging an arm attached to the rod of the feeding means whereby the marker will be actuated and the feeding means operated twice during each revolution of the shaft and means for rotating the shaft.

In testimony whereof we affix our signatures.

WILLIAM A. COLMAN.
FRANK E. RANDALL.